(12) United States Patent
Teslovich

(10) Patent No.: US 9,964,023 B1
(45) Date of Patent: May 8, 2018

(54) PRECHAMBER FOR INTERNAL COMBUSTION ENGINE

(71) Applicant: Darius Teslovich, Franklin, PA (US)

(72) Inventor: Darius Teslovich, Franklin, PA (US)

( * ) Notice: Subject to any disclaimer, the term of this patent is extended or adjusted under 35 U.S.C. 154(b) by 63 days.

(21) Appl. No.: 15/144,774

(22) Filed: May 2, 2016

Related U.S. Application Data

(60) Provisional application No. 62/156,186, filed on May 1, 2015.

(51) Int. Cl.
| | |
|---|---|
| *F02B 19/12* | (2006.01) |
| *F02M 43/04* | (2006.01) |
| *F02M 57/06* | (2006.01) |
| *F02B 19/10* | (2006.01) |
| *F02M 21/02* | (2006.01) |

(52) U.S. Cl.
CPC .......... *F02B 19/12* (2013.01); *F02B 19/1004* (2013.01); *F02B 19/1085* (2013.01); *F02M 21/0275* (2013.01); *F02M 43/04* (2013.01); *F02M 57/06* (2013.01)

(58) Field of Classification Search
CPC ...... F02B 19/12; F02B 19/00; F02B 19/1004; F02B 19/1085; F02B 19/108; F02B 21/0275; F02M 43/04; F02M 57/00; F02M 57/06

See application file for complete search history.

(56) References Cited

U.S. PATENT DOCUMENTS

| | | | | |
|---|---|---|---|---|
| 8,925,518 | B1 * | 1/2015 | Riley | F02B 19/10 123/261 |
| 2002/0104507 | A1 * | 8/2002 | Riggs | F02B 19/12 123/266 |
| 2014/0352656 | A1 * | 12/2014 | Kolhouse | F02B 31/085 123/308 |

* cited by examiner

*Primary Examiner* — Jacob Amick
(74) *Attorney, Agent, or Firm* — William F. Lang IV; Lang Patent Law LLC

(57) ABSTRACT

A prechamber is provided for attachment to an inlet of a combustion chamber of an internal combustion engine. The prechamber decreases the compression ratio of the combustion chamber. Some examples of the prechamber include a means of adding a spark plug to an engine that was originally designed to ignite fuel/air through compression of the fuel/air. Other examples of the prechamber include internal structures to introduce "swirl" in fuel/air as it is injected. Still other examples of the prechamber include a plurality of fuel injectors, with each fuel injector being structured to introduce a different type of fuel into the prechamber. A means of selecting a specific type of fuel based on engine operating conditions is also provided.

17 Claims, 8 Drawing Sheets

PRECHAMBER FOR INTERNAL COMBUSTION ENGINE

CROSS REFERENCE TO RELATED APPLICATION

This application claims the benefit of U.S. provisional patent application Ser. No. 62/156,186, filed May 1, 2015, and entitled "Prechamber for Internal Combustion Engine."

TECHNICAL FIELD

The present invention relates to the conversion of internal combustion engines to utilize different fuels from those for which the engine was originally designed. More specifically, a prechamber is provided for attachment to an inlet for a combustion chamber.

BACKGROUND INFORMATION

Most internal combustion engines in use today run on either gasoline or diesel fuel. The cost of such fuels has made engines that run on compressed natural gas (CNG) attractive for those who use their vehicles extensively as well as have access to a supply of CNG. Converting a diesel engine to run on compressed natural gas requires decreasing the compression ratio of the engine, as well as providing a way to install a spark plug (most diesel engines ignite the fuel/air mixture using compression of the fuel rather than a spark plug). Many methods of accomplishing these goals require permanent modification of the engine components through machining. Thus, a simplified method of increasing the compression ratio while providing a means of installing a spark plug, without permanent modification of the engine, is desired.

Due to the sporadic availability of CNG, as well as the fact that, depending on engine temperature, CNG may not always be the optimal fuel choice, it would be desirable to have an engine that could selectively utilize one of a plurality of different fuels is desirable. The ability to select the desired fuel manually, through a microcontroller based on information about engine operating conditions, or both, would increase the likelihood of an optimal fuel being selected for a give set of driving conditions.

SUMMARY

The above needs are met by a prechamber for an internal combustion engine, with the internal combustion chamber having at least one combustion chamber with an opening defined therein. The prechamber has a housing. The housing defines an upper portion, a lower portion, and a chamber therein. A first fuel injector has an outlet disposed within the housing. A connecting structure is disposed at the lower end of the prechamber. The connecting structure is dimensioned and configured to secure the prechamber to the opening defined within the combustion chamber.

The above needs are further met by a method of selecting a fuel for a multi-fuel internal combustion engine, with the internal combustion engine having at least one combustion chamber. The method comprises providing a prechamber for each combustion chamber of the internal combustion engine. The prechamber has a first fuel injector and a second fuel injector. Each of the first fuel injector and second fuel injector are operatively connected to a different fuel source. A control system is provided. Information about engine operation is communicated to the control system. The control system is utilized to activate either the first fuel injector or the second fuel injector based on information about engine operation.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
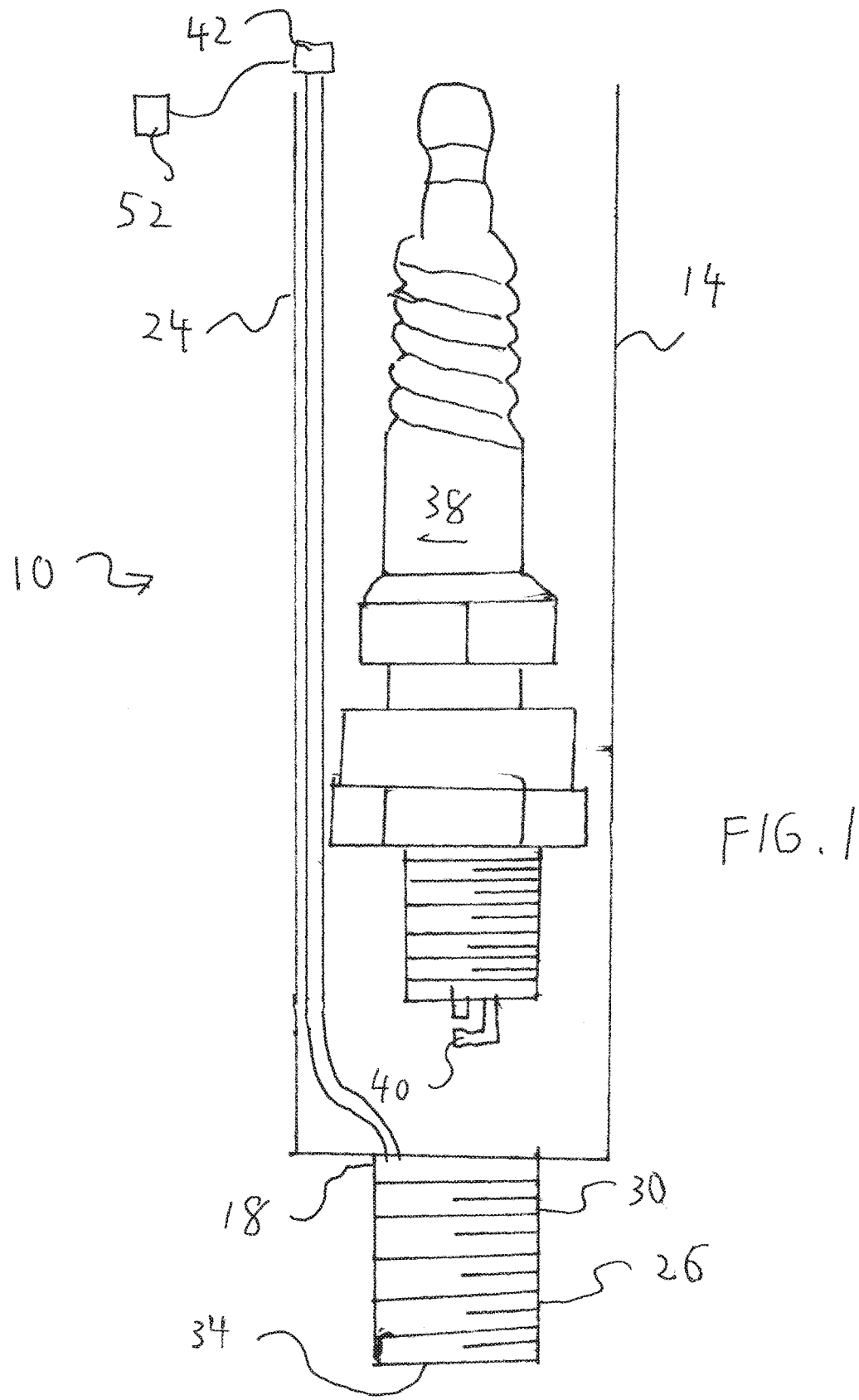
FIG. 1 is a cross-sectional side view of a prechamber.
Figure 2:
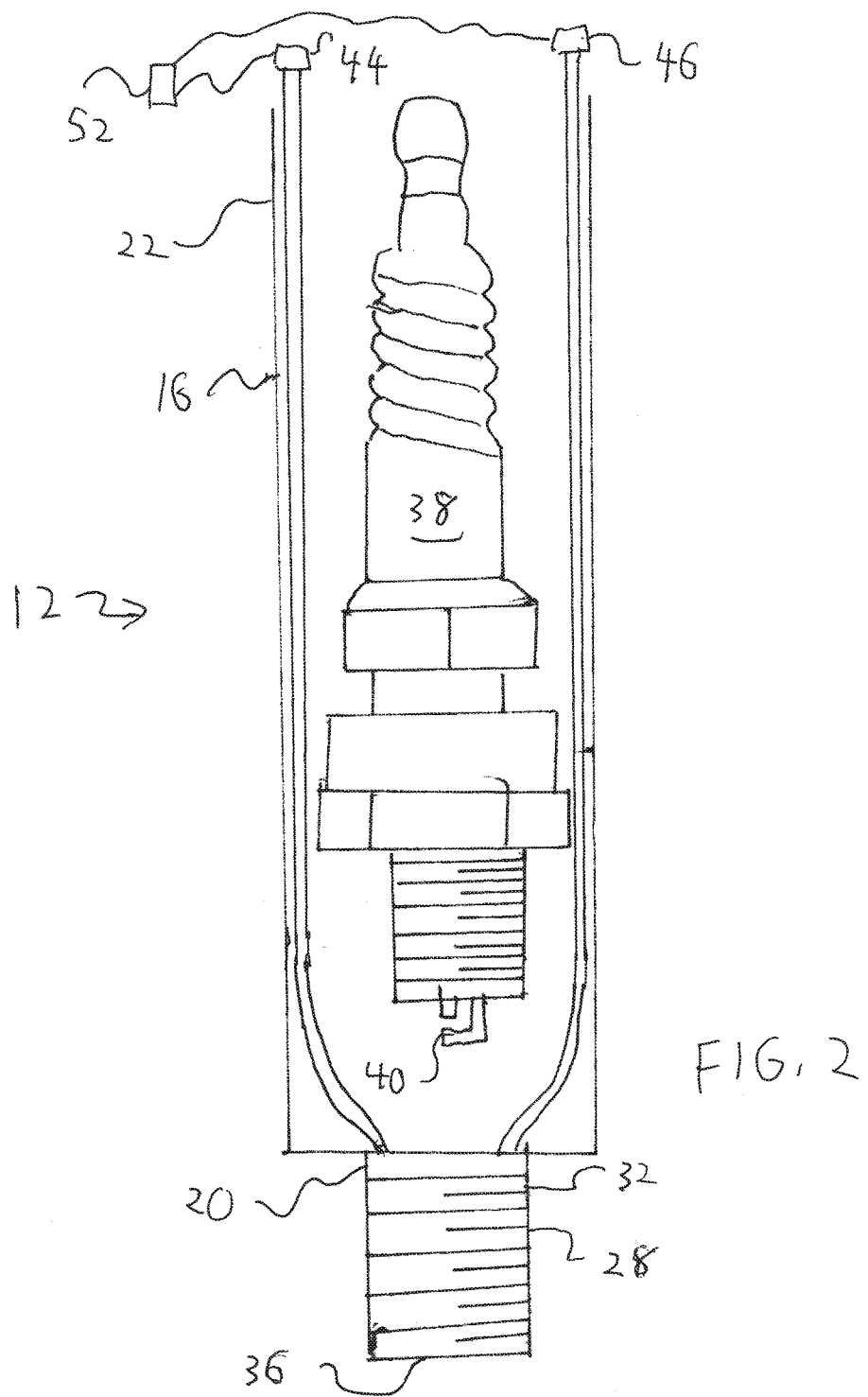
FIG. 2 is a cross-sectional side view of another prechamber.

Referring to FIGS. 1-2, two examples of a prechamber 10, 12 are illustrated. Prechamber 10 is designed for use with a single fuel, for example, compressed natural gas. Prechamber 12 is designed so that two or more fuels may be utilized, for example, compressed natural gas or diesel fuel, or as another example, compressed natural gas and gasoline. The prechambers 10, 12 are designed to be secured to the fuel inlet of a combustion chamber of an engine cylinder, thus providing a means of placing a spark plug within communication with the combustion chamber as well as achieving other benefits described below. (Diesel engines typically do not include spark plugs, and rely on compression of the fuel to cause ignition.) Alternatively, if the prechamber is utilized with an engine having a spark plug, the prechamber may be designed for attachment in the location where a spark plug would normally be placed.

The prechamber 10 includes a housing 14. Similarly, the prechamber 12 includes a housing 16. In some examples, the housings 14, 16 are generally cylindrical. In other examples, the housings 14, 16 may include a lower portion 18, 20, respectively, and an upper portion 22, 24, respectively, with the upper portion 22, 24 having a larger diameter or width than the lower portion 18, 20. It is generally advantageous for the lower portions 18, 20 of the housings 14, 16 to be generally cylindrical in order to facilitate threaded attachment to the inlet of a cylinder of an engine. In the illustrated example, threads 26, 28 are provided on the external surface 30, 32, adjacent to the outlet end 34, 36 of the prechamber 10, 12. However, if an engine were provided with a different shape cylinder inlet, then a different shape lower portion 18, 20 could be utilized without departing from the invention. The upper portion 22, 24 may be cylindrical, or may be some other shape, such as square or rectangular, depending on the amount of space available within or adjacent to the engine. The angle at which the prechamber 10, 12 is mounted to the cylinder inlet can also be preselected in order to accommodate different engine designs and/or to create a desired "swirl" within the fuel entering the combustion chamber.

A spark plug 38 is disposed within each of the housings 14, 16. In the illustrated examples, the majority of the spark plug 38 is disposed within the upper portion 22, 24 of the housing 14, 16, with the spark generating end 40 being disposed within the lower portion 18, 20 of the housing 14, 16. Some examples of the spark plug 38 may be structured to provide a stronger spark then would typically be provided for a gasoline engine. The spark plug 38 is operatively connected to a control system that is described in greater detail below.

Each of the prechambers 10, 12 includes at least one injector. The prechamber 10, which is designed for a single fuel, includes a single injector 42. The prechamber 12, which is intended for use with two fuels, includes an injector 44 and another injector 46. For purposes of ease of explanation, the example of the prechamber 12 will be described utilizing the injector 44 to inject compressed natural gas into the prechamber 12, and utilizing the injector 46 to inject diesel fuel into the prechamber 12. Each of the injectors 42, 44, 46 includes an inlet (not shown, but well known to those skilled in the art) that is operatively connected to its fuel source. Fuel injectors are well known in the art of vehicle engines, and are therefore not described in detail herein. Each of the injectors 42, 44, 46 is structured to inject fuel into the lower portion 18, 20 of the prechamber 10, 12. Each of the injectors 42, 44, 46 is also operatively connected to a control system which will be described in greater detail below.

Figure 6:
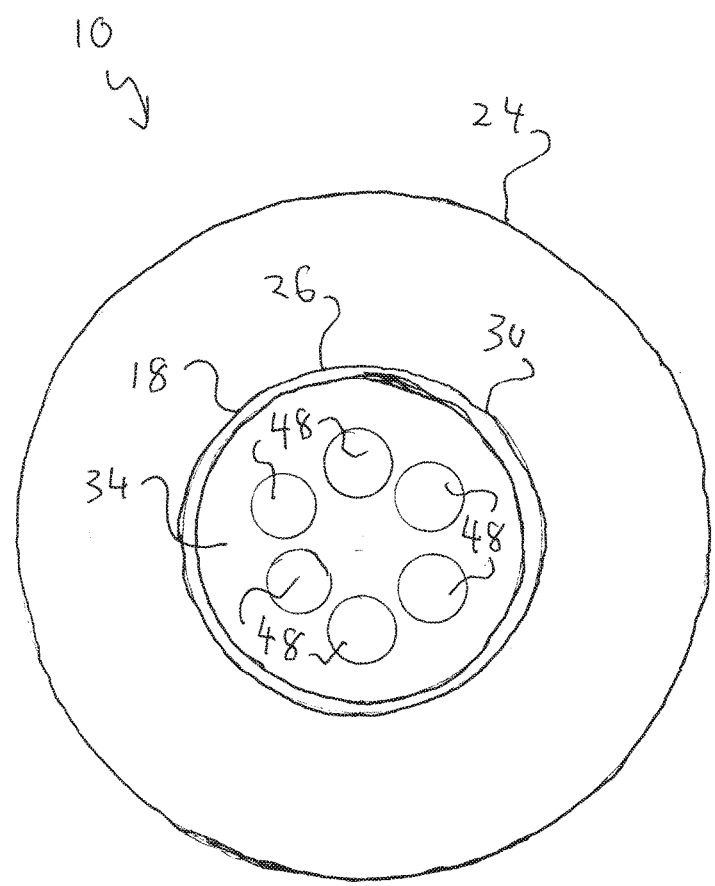
FIG. 6 is a bottom plan view of a prechamber.

The outlet end 34, 36 of the prechamber 10, 12 is structured to regulate the passage of fuel from the prechamber 10, 12 into the combustion chamber of the engine cylinder to which the prechamber 10, 12 is attached. This regulation is established by the size and number of apertures 48 (FIG. 6) are defined within the outlet end 34, 36. Some examples may utilize a single, larger aperture 48 while other examples may utilize a larger number of smaller apertures 48, depending on the desired rate of passage of fuel from the prechamber 10, 12 into the engine cylinders combustion chamber. Although FIG. 6 is depicted as the bottom of the prechamber 10, the bottoms of the prechambers 12, 78, and 80 (described below) are identical, and may vary as described herein.

The spark plugs 38, and injectors 42, 44, 46, are all controlled by a control system 52. The control system 52 can take different forms within the scope of the invention. In some examples, the control system 52 is in the form of a microcontroller that replaces the standard microcontroller that would control the operation of a standard diesel engine. In other examples, the control system 52 may be a second microcontroller that is operatively connected to the standard microcontroller that is already present within the engine. As yet another example, the control system 52 may be the standard microcontroller that was originally supplied with the engine, reprogrammed to accommodate the fuel or fuels with which the prechambers 10, 12 will be utilized. Regardless of which of the above examples of a control system 52 is utilized, the control system 52 can be selected from a variety of microcontrollers, including general-purpose programmable microcontrollers, programmable logic devices such as field programmable gate arrays, application specific integrated circuits, and custom integrated circuits.

If a multi-fuel system is used, then the control system 52 is structured to inject the appropriate fuel into the prechamber 12. Some examples may permit the driver to select the appropriate fuel by utilizing a switch. Thus, if the driver is in a location where one type of fuel is available and another type of fuel is not available for purchase, the driver may select to use the type of fuel that can be purchased locally. The driver may also vary the selection of fuel based on the driver's own monitoring of engine conditions. Other examples may provide for automatic selection of the appropriate fuel based on engine conditions. For example, compressed natural gas may be utilized as the default fuel, but a switch to diesel fuel may be triggered by connecting presently existing engine temperature and/or engine knock sensors to the controller 52, so that excessive temperature or engine knocking triggers a switch to diesel fuel. Still other examples may provide for both manual and automatic fuel selection. If a switch to diesel fuel is made, then the controller 38 may continue to trigger the spark plug 38 for ignition, or alternatively may discontinue triggering the spark plug 38 in favor of compression ignition within the cylinder. In the event that the controller 52 includes a second microcontroller added to the vehicle's standard controller, then the second controller may control engine operation during use of compressed natural gas, turning control over to the standard microcontroller when diesel fuel is being used.

Regardless of whether a single fuel or multi-fuel engine is being used, the timing of ignition for the spark plug 38 is selected so that fuel within the prechamber 10, 12 is ignited as fuel within the compression chamber of the engine cylinder is being compressed. As the burning fuel within the prechamber 10, 12 passes through the outlet 34, 36 of the prechamber 10, 12 into the combustion chamber of the cylinder, the ignition is transferred from this fuel to the fuel within the combustion chamber. The timing of this transfer of ignition is preferably such that the fuel within the combustion chamber ignites as it reaches maximum compression. As is well known in the art of internal combustion engines, the crankshaft to which the pistons are secured is turning as a result of combustion within other cylinders within the engine. When the piston of a given cylinder is at the maximum compression position, it is also optimally positioned so that the expansion of combustion products within its associated combustion chamber will drive the piston back, thus continuing to supply power to the crankshaft and turning the crankshaft in the desired direction. Different fuels burn at different rates, with diesel fuel being one of the slowest burning fuels. Taking this into account, switching fuels will also cause the control system 52 to adjust the timing of ignition of the spark plug 38 accordingly, thus ensuring that regardless of which fuel is selected, fuel within the combustion chamber of the cylinder is ignited at the appropriate time.

The control system, along with the injectors 42, 44, 46 will also vary the air/fuel mixture being injected into the prechambers 10, 12 according to the type of fuel being used. As one example, and air/fuel ratio of 14.7/1 is common for diesel fuel, and an air/fuel ratio of 17.2/1 is common for compressed natural gas. Other air/fuel ratios may be used as may be appropriate for the selected fuel. As another option, the air/fuel ratio for a given fuel could be varied either manually or automatically in an effort to achieve improved air emissions, better fuel efficiency, and/or reduced detonation or "knocking."

Figure 4:
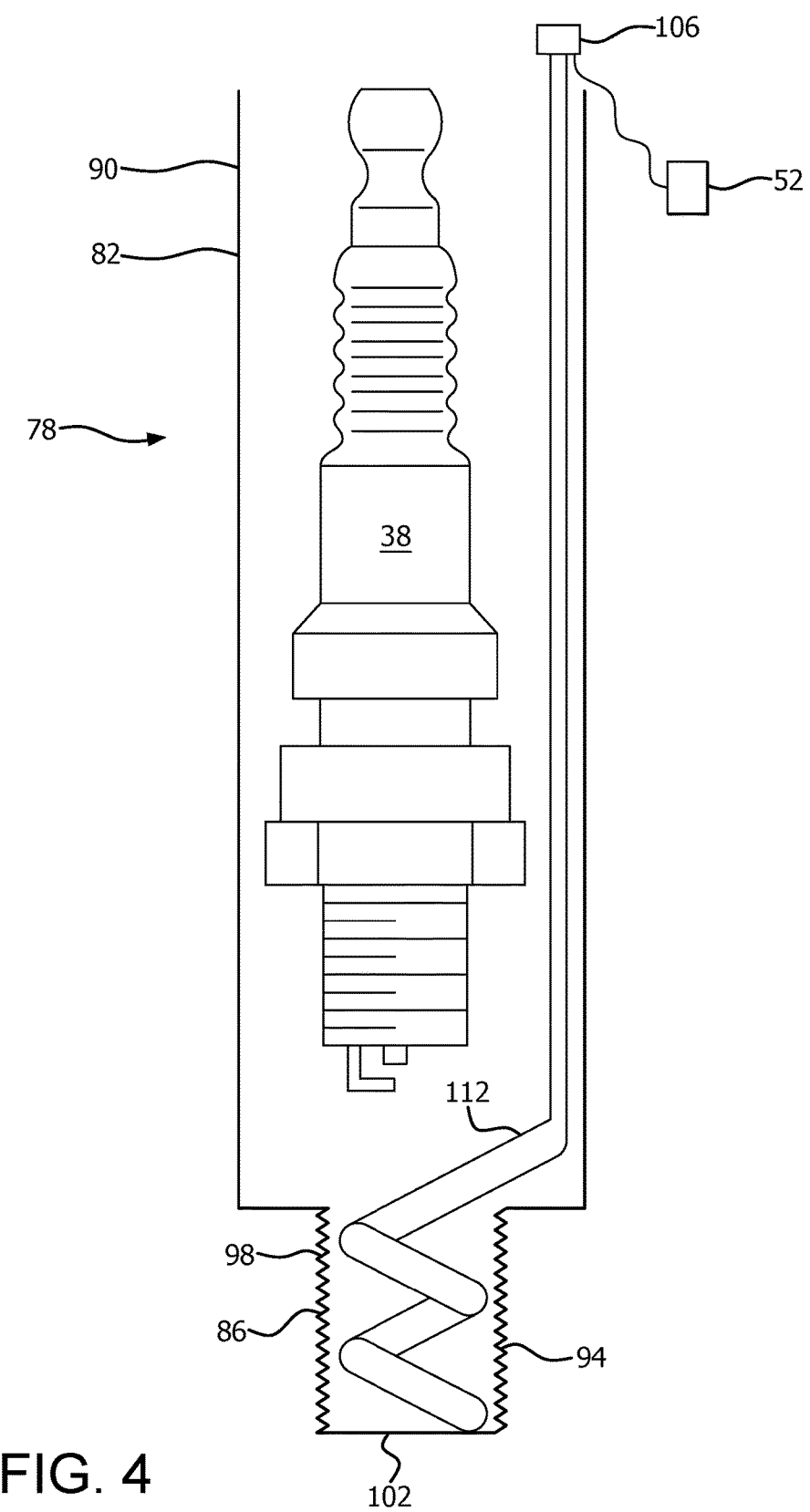
FIG. 4 is a cross-sectional side view of yet another prechamber.
Figure 5:
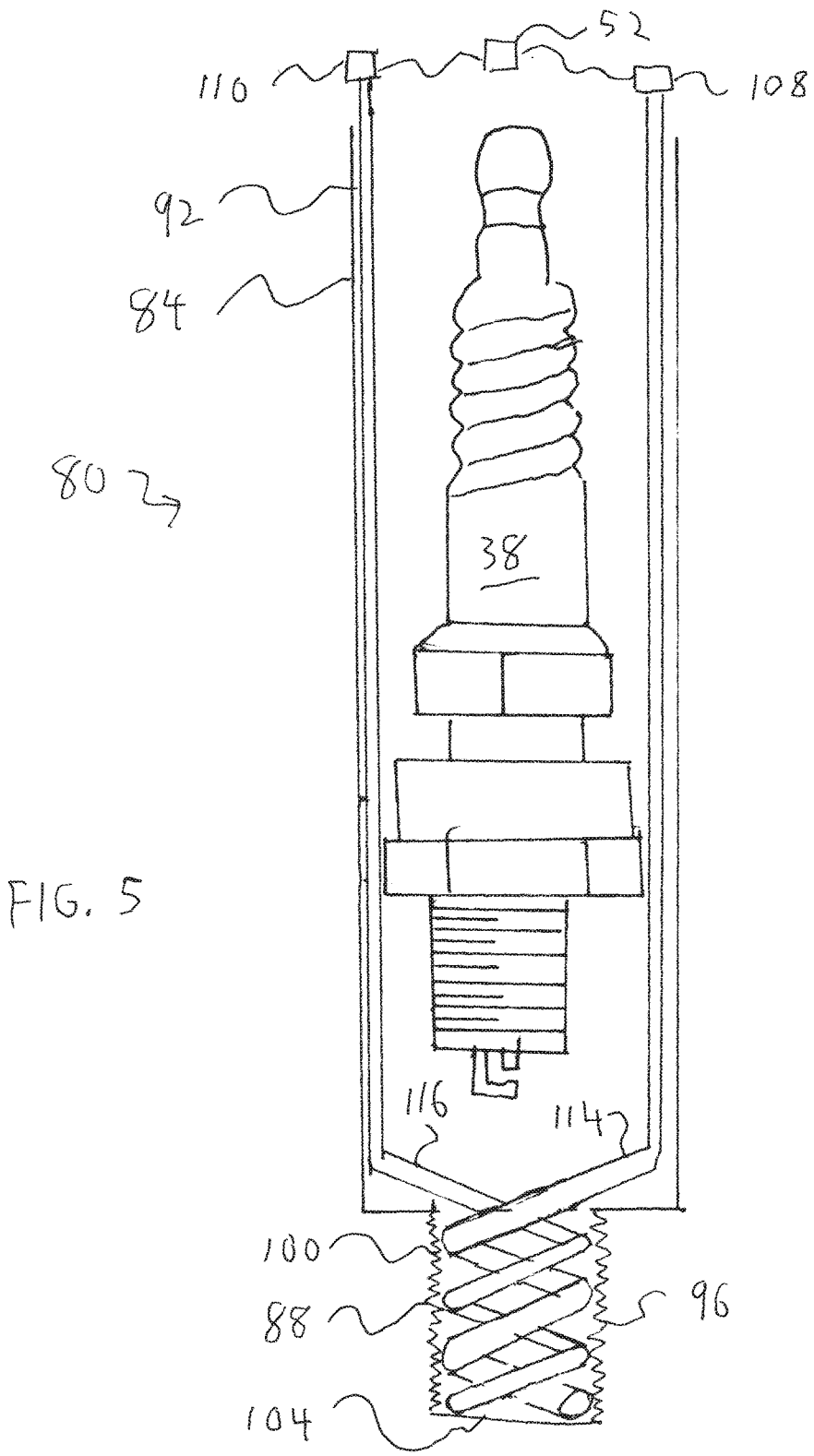
FIG. 5 is a cross-sectional side view of still another prechamber.

Referring to FIGS. 4 and 5, a variation of the fuel injectors is illustrated. The prechamber 78 of FIG. 4 is utilized for a single fuel system, such as compressed natural gas. Similarly, the prechamber 80 of FIG. 5 is utilized for a multi-fuel system, for example, compressed natural gas and diesel fuel. The prechambers 78, 80 are similar to the prechambers 10, 12, with an additional feature to provide a swirl to the fuel entering the prechamber, thus resisting any tendency for "dead spots" to form within the prechamber wherein combustion does not take place.

The prechamber 78 includes a housing 82. Similarly, the prechamber 80 includes a housing 84. In some examples, the housings 82, 84 are generally cylindrical. In other examples, the housings 82, 84 may include a lower portion 86, 88, respectively, and an upper portion 90, 92, respectively, with the upper portion 90, 92 having a larger diameter or width than the lower portion 86, 88. It is generally advantageous for the lower portions 86, 88 of the housings 82, 84 to be generally cylindrical in order to facilitate threaded attachment to the inlet of a cylinder of an engine. In the illustrated example, threads 94, 96 are provided on the external surface 98, 100, adjacent to the outlet end 102, 104 of the prechambers 78, 80, which is identical to the outlet end 34, 36 of the prechambers 10, 12. However, if an engine were provided with a different shape cylinder inlet, then a different shape lower portion 86, 88 could be utilized without departing from the invention. The upper portion 90, 92 may be cylindrical, or may be some other shape, such as square or rectangular, depending on the amount of space available within or adjacent to the engine. The angle at which the prechamber 78, 80 is mounted to the cylinder inlet can also be preselected in order to accommodate different engine designs and/or to create a desired "swirl" within the fuel entering the combustion chamber.

A spark plug 38 is disposed within each of the housings 82, 84. In the illustrated examples, the majority of the spark plug 38 is disposed within the upper portion 90, 92 of the housing 82, 84, with the spark generating end 40 being disposed within the lower portion 86, 88 of the housing 82, 84. Some examples of the spark plug 38 may be structured to provide a stronger spark then would typically be provided for a gasoline engine. The spark plug 38 is operatively connected to a control system that is the same as the control system described in connection with the prechambers 10, 12.

Each of the prechambers 78, 80 includes at least one injector. The prechamber 78, which is designed for a single fuel, includes a single injector 106. The prechamber 80, which is intended for use with two fuels, includes an injector 108 and another injector 110. For purposes of ease of explanation, the example of the prechamber 80 will be described utilizing the injector 108 to inject compressed natural gas into the prechamber 80, and utilizing the injector 110 to inject diesel fuel into the prechamber 80. Each of the injectors 106, 108, 110 includes an inlet (not shown, but well known to those skilled in the art) that is operatively connected to its fuel source. Fuel injectors are well known in the art of vehicle engines, and are therefore not described in detail herein. Each of the injectors 106, 108, 110 is structured to inject fuel into the lower portion 86, 88 of the prechamber 78, 80. Each of the injectors 106, 108, 110 is also operatively connected to a control system which will be described in greater detail below.

The injectors 106, 108, 110, includes an injector tube 112, 114, 116, which is structured to impart a "swirl" to the fuel/air mixture passing through the injector tube 112, 114, 116. The illustrated injector tubes 112, 114, 116 are in the form of a spiral around the inside of the housings 82, 84 for their respective prechambers 78, 80. This spiral-type motion will largely continue as the fuel/air mixture exits the injector tubes 112, 114, 116, as the inertia of the fuel/air mixture causes it to follow the walls of the housing 82, 84 as it enters the engine's combustion chamber. As the piston rises within the engine's combustion chamber, the fuel/air mixture will be pushed back into the prechamber 78, 80, wherein its own inertia will cause the fuel/air mixture to follow the paths defined by the walls of the housings 82, 84 as well as the injector tubes 112, 114, 116, resulting in an upward spiral of fuel/air mixture entering the prechamber from the combustion chamber. This "swirl" will ensure that fuel/air mixture is flowing around the prechamber and combustion chamber during ignition of the spark plug 38. As combustion spreads thermally throughout the fuel/air mixture, the motion of the burning fuel/air mixture will ensure the thermal spread of combustion throughout substantially the entire fuel/air mixture throughout the prechamber and combustion chamber, thus resisting any tendency of the combustion process to fail to reach any portion of the fuel/air mixture within the prechamber and combustion chamber.

Figure 3A:
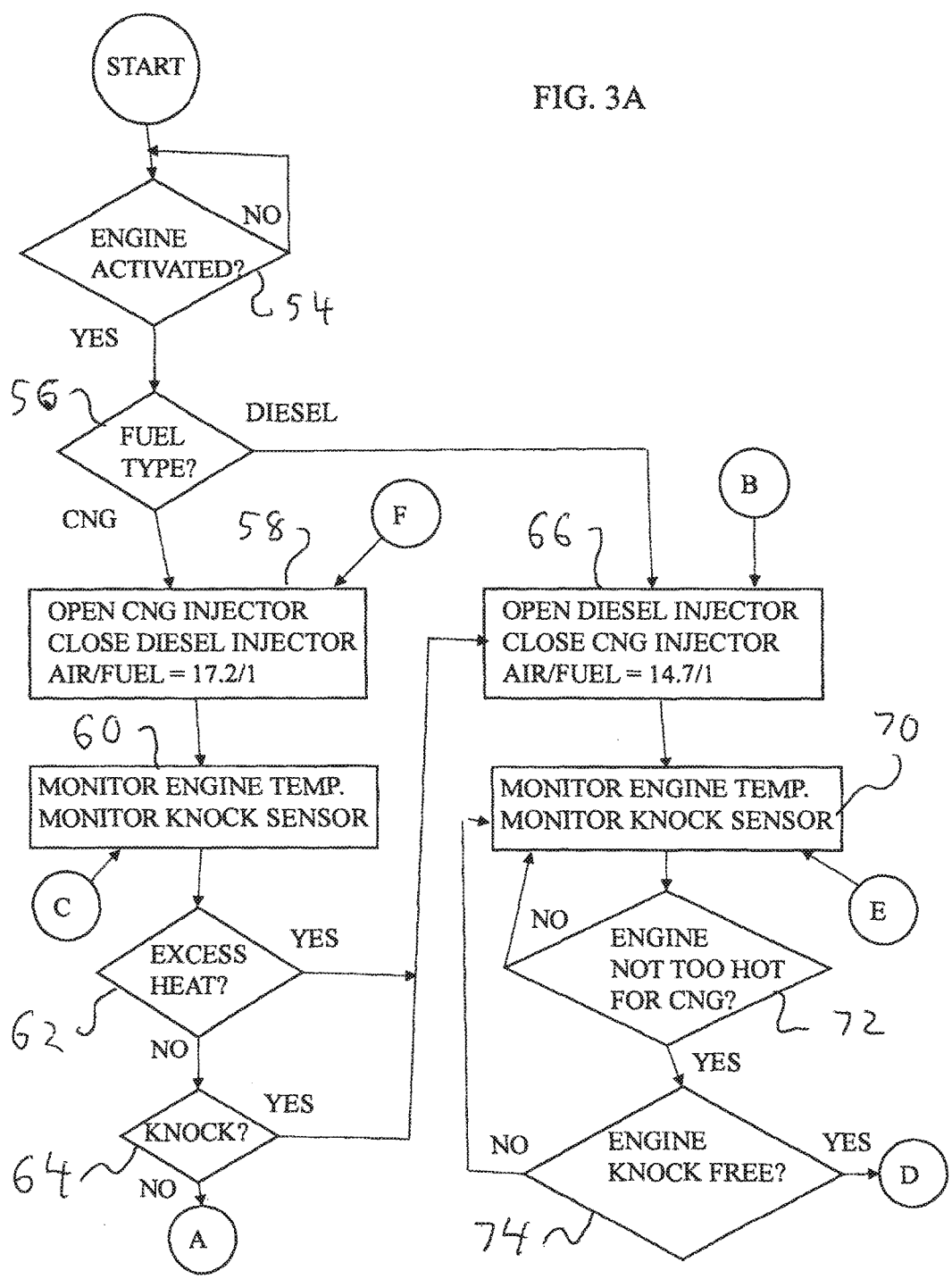
FIGS. 3A-3B are a flowchart showing an example of a fuel switching process used by a control system for use in connection with the prechamber of FIG. 2.
Figure 3B:
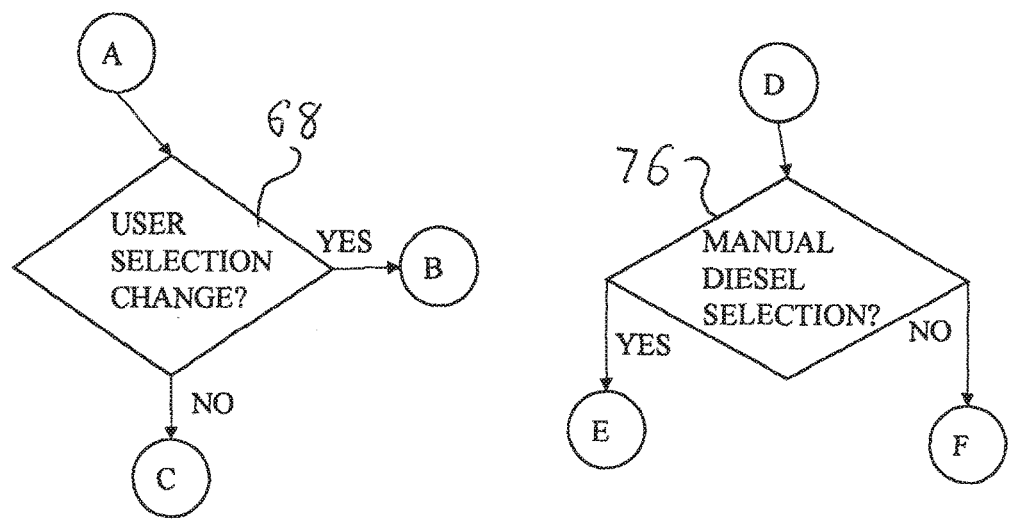

Referring to FIGS. 3A-3B, an example of the operation of the control system 52 is illustrated. Once the control system 52 senses that the engine has been activated at step 54, it will then check to see which fuel type is desired at step 56. This example assumes that compressed natural gas will be the default fuel choice, but allows for both manual and automatic selection of diesel at appropriate times.

If compressed natural gas is selected, injector 44 will be opened and injector 46 will simultaneously be closed, at step 58. The correct air/fuel ratio will be communicated to the injector. The engine temperature, as well is engine knock, will be monitored through pre-existing sensors which are typically included with a standard engine, at step 60. If either excessive engine temperature (step 62) or knock (step 64) are detected, and the control system 52 will switch from compressed natural gas to diesel by opening the diesel injector, simultaneously closing the compressed natural gas injector, and modifying the air/fuel ratio appropriately, at step 66. If not, then the control system 52 will continue to monitor these conditions, as well is checking for whether the user has manually changed to diesel fuel at step 68.

If diesel fuel is selected by either the driver or the control system 52, the diesel injector will be opened, the compressed natural gas injector will be closed, and the air/fuel ratio will be set accordingly, at step 66. The engine temperature and knock sensor will be monitored at step 70. Because the illustrated example assumes that compressed natural gas is the preferred fuel unless the driver his selected diesel, or unless engine conditions have made diesel preferable, the system will switch to compressed natural gas if the engine temperature is suitable for compressed natural gas (step 72), the engine is running smoothly and knock-free for a predetermined time interval (step 74), and there has not been a manual selection of diesel (step 76). Otherwise, the engine will continue to run diesel fuel as long as the driver so desires, and/or engine conditions it so dictate. Other decision-making criteria could be utilized in other examples depending upon the priorities under which the system is designed without departing from the scope of the invention.

Figure 7:
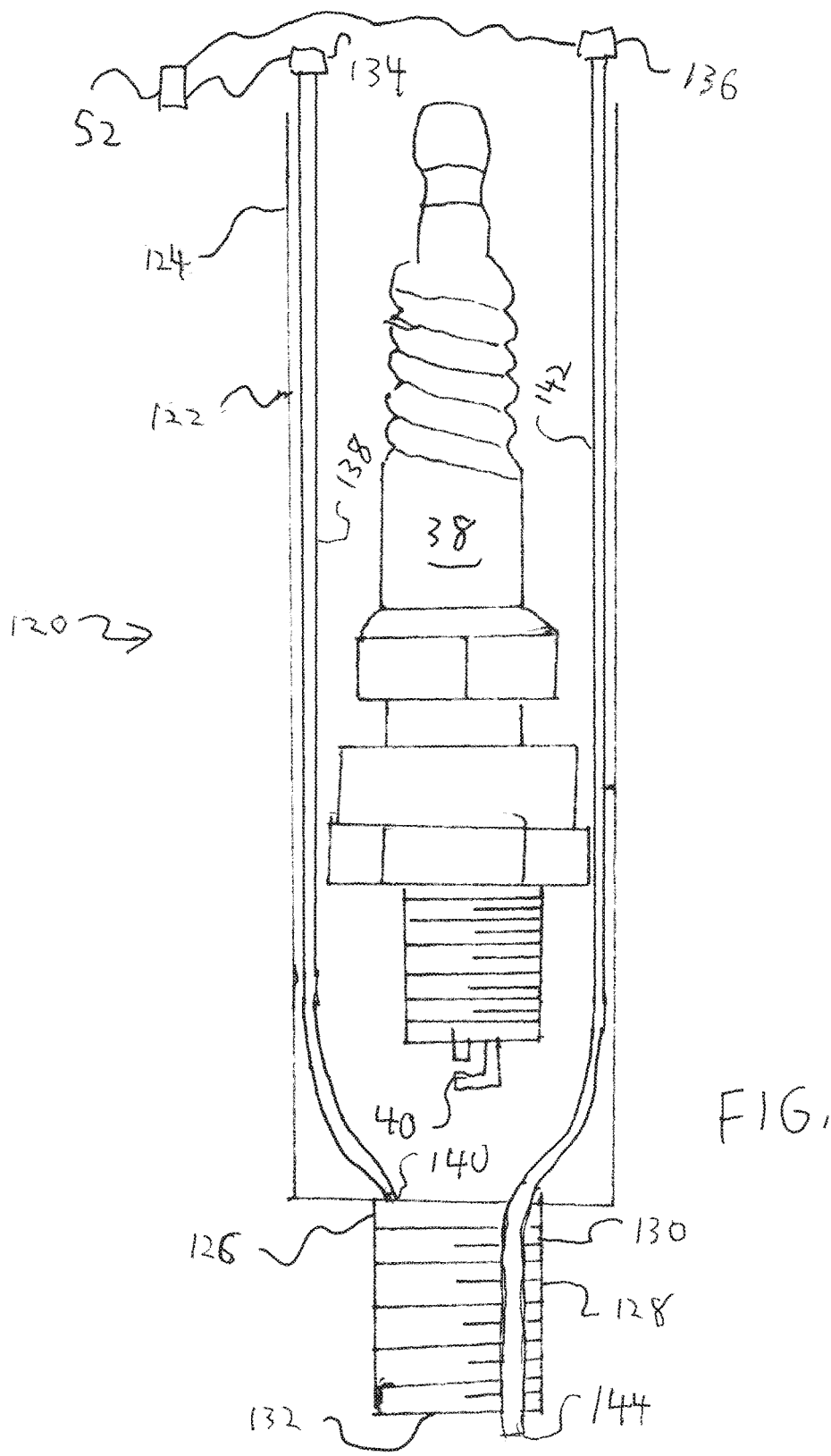
FIG. 7 is a cross sectional view of an alternative prechamber.

FIG. 7 illustrates yet another prechamber 120, which is substantially the same as the prechamber 12. The prechamber 120 includes a housing 122 having an upper portion 124, a lower portion 126 having threads 128 around the exterior surface 130 thereof, and an outlet 132 that is structured to communicate with a standard engine combustion chamber. The prechamber 12 also includes a spark plug 38 as described above. The prechamber 120 differs in that the fuel injectors include a pre-injector 134 and a main injector 136. The pre-injector 134 includes an injector tube 138 having an outlet 140 within the prechamber 120, adjacent to the spark generating means 40 of the spark plug 38. The main injector 136 includes an injector tube 142 terminating below the outlet 132 of the prechamber, so that fuel is injected into the engine's combustion chamber. (Please note that the other prechambers described herein may also have one or more fuel injectors having injector tubes that extend to a position wherein they will inject fuel/air directly into the combustion chamber rather than the prechamber.) The pre-injector 143 may be used to inject a different fuel/air ratio, for example, a fuel/air ratio more heavily balanced towards fuel, or richer, into the prechamber 120, adjacent to the spark generating means 40 of the spark plug 138. The main injector 136 may inject a fuel/air mixture having a different fuel/air ratio than the pre-injector 134, for example, a fuel/air mixture that is more heavily balanced towards air, or leaner, into the engine combustion chamber. Ignition of the richer mixture in the prechamber 120 is then used to ignite the leaner mixture in the engine's combustion chamber. As another option, different fuels may be injected by the injectors 134, 136, so that the fuel type injected by injector 134 is used to ignite the fuel type injected by the injector 136.

The present invention therefore provides a prechamber that may be used to convert an internal combustion engine from one type of fuel to another type of fuel, for example, from diesel to compressed natural gas, or from gasoline to compressed natural gas. The prechamber may alternatively be used to convert a single fuel engine to a multi-fuel engine, which in some examples will include both the original fuel for which the engine was designed (diesel or gasoline) and compressed natural gas. The prechamber provides a means of adding a spark plug to an engine that was originally designed to ignite fuel through compression. The prechamber, in conjunction with the control system described herein, may provide better air emissions, improved fuel economy, and reduced engine knocking. Some examples of the prechamber may be structured to inject fuel/air in a manner that creates "swirl," thus maximizing the amount of fuel/air to which the combustion process is thermally transferred. Other examples of the prechamber may inject different fuel/air mixtures into the prechamber and the engine combustion chamber, utilizing ignition of the fuel/air mixture within the prechamber to ignite the fuel/air mixture within the combustion chamber.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A prechamber for an internal combustion engine, the internal combustion engine having at least one combustion chamber, the combustion chamber having an opening defined therein, the prechamber comprising:
   a housing, the housing defining an upper portion, a lower portion, and a chamber therein;
   a first fuel injector, the first fuel injector having an outlet disposed within the housing, the first fuel injector including an outlet tube forming a spiral adjacent to the housing, the spiral being structured to introduce a swirl within a fuel/air mixture that is injected into the prechamber, and
   a connecting structure disposed at the lower end of the prechamber; the connecting structure being dimensioned and configured to secure the prechamber to the opening defined within the combustion chamber.

2. The prechamber according to claim 1, further comprising a spark plug disposed therein.

3. The prechamber according to claim 2, further comprising a control system for controlling activation of the spark plug.

4. The prechamber according to claim 2, further comprising a second fuel injector, the second fuel injector having an outlet disposed within the housing, the first fuel injector and second fuel injector being operatively connected to different fuel sources.

5. The prechamber according to claim 4, further comprising a selection system for selectively activating either the first fuel injector or the second fuel injector.

6. The prechamber according to claim 5, wherein the selection system is manually operated.

7. The prechamber according to claim 5, wherein the selection system includes a control system structured to receive information about engine operation, and to select either the first fuel injector or second fuel injector based on the information about engine operation.

8. The prechamber according to claim 7, wherein the control system is structured to receive information about engine conditions selected from the group consisting of engine temperature and engine knock, and to select either the first fuel injector or second fuel injector based at least in part upon the information about engine conditions.

9. The prechamber according to claim 7, wherein the selection system includes a control system that is structured to receive information about a driver fuel selection, and to select either the first fuel injector or second fuel injector based on both the information about engine operation and information about driver fuel selection.

10. The prechamber according to claim 9, wherein the control system is structured to receive information about engine conditions selected from the group consisting of engine temperature and engine knock, and to select either the first fuel injector or second fuel injector based at least in part upon the information about engine conditions.

11. The prechamber according to claim 1, further comprising a second fuel injector, the second fuel injector having an outlet disposed within the housing, the first fuel injector and second fuel injector being operatively connected to different fuel sources.

12. The prechamber according to claim 11, further comprising a selection system for selectively activating either the first fuel injector or the second fuel injector.

13. The prechamber according to claim 12, wherein the selection system is manually operated.

14. The prechamber according to claim 12, wherein the selection system includes a control system structured to receive information about engine operation, and to select either the first fuel injector or second fuel injector based on the information about engine operation.

15. The prechamber according to claim 14, wherein the control system is structured to receive information about engine conditions selected from the group consisting of engine temperature and engine knock, and to select either the first fuel injector or second fuel injector based at least in part upon the information about engine conditions.

16. The prechamber according to claim 14, wherein the selection system includes a control system that is structured to receive information about a driver fuel selection, and to select either the first fuel injector or second fuel injector based on both the information about engine operation and information about driver fuel selection.

17. The prechamber according to claim 16, wherein the control system is structured to receive information about engine conditions selected from the group consisting of engine temperature and engine knock, and to select either the first fuel injector or second fuel injector based at least in part upon the information about engine conditions.

* * * * *